United States Patent [19]

Hoashi

[11] Patent Number: 4,844,918
[45] Date of Patent: Jul. 4, 1989

[54] FOOD PRODUCT WITH CAPSULES CONTAINING MEAT SOAP OR JUICE

[75] Inventor: Chikako Hoashi, Tokyo, Japan

[73] Assignee: Yugenkaisha Matsubei, Tokyo, Japan

[21] Appl. No.: 895,868

[22] Filed: Aug. 12, 1986

[30] Foreign Application Priority Data

Aug. 16, 1985 [JP] Japan ................ 60-180276

[51] Int. Cl.⁴ ............................................. A23L 1/317
[52] U.S. Cl. ...................... 426/92; 426/138; 426/575
[58] Field of Search ............ 426/92, 94, 89, 576, 426/577, 578, 574, 277, 283, 650, 138, 646

[56] References Cited

U.S. PATENT DOCUMENTS

| | | | |
|---|---|---|---|
| 428,502 | 5/1890 | Maggi | 426/576 |
| 628,681 | 7/1899 | Valentine | 426/89 |
| 2,331,598 | 10/1943 | Cook et al. | 426/138 |
| 2,358,598 | 9/1944 | Scherer | 426/138 |
| 3,867,556 | 12/1972 | Darragh | 426/98 |
| 3,922,360 | 11/1975 | Sneath | 426/89 |
| 4,119,739 | 10/1978 | Barwick et al. | 426/575 |
| 4,202,108 | 5/1980 | Nesmeyanou et al. | 426/89 |
| 4,276,312 | 6/1981 | Merrett | 426/650 |
| 4,303,681 | 12/1981 | Challen et al. | 426/92 |
| 4,689,235 | 8/1987 | Barnes | 426/89 |
| 4,695,466 | 9/1987 | Morishita | 426/89 |
| 4,702,921 | 10/1987 | Ueda | 426/576 |

FOREIGN PATENT DOCUMENTS

| | | | |
|---|---|---|---|
| 5642536 | 9/1979 | Japan . | |
| 131375 | 10/1981 | Japan | 426/138 |
| 1302275 | 1/1973 | United Kingdom | 426/89 |

Primary Examiner—Donald E. Czaja
Assistant Examiner—Carolyn Paden
Attorney, Agent, or Firm—Beveridge, DeGrandi & Weilacher

[57] ABSTRACT

Foods such as jiaozi, shaomai, wonton, shaoronpo, hamburg, sausage, meat-filled buns or the like, which are characterized by containing edible capsules having encapsulated therein meat soup or juice. The capsules-incorporated foods of the present invention can exhibit an improved taste in comparison with the prior art foods.

10 Claims, 2 Drawing Sheets

FOOD PRODUCT WITH CAPSULES CONTAINING MEAT SOAP OR JUICE

BACKGROUND OF THE INVENTION

1. Field of the Invention

The present invention relates to or food products which comprise encapsulated meat soup or juice. These foods with meat soup capsules can be usefully applied to the production of a variety of foods such as jiaozi (Chinese meat dumplings), shaomai (steamed meat dumplings), wonton (Chinese Meat-stuffed dumplings served in soup), shaoronpo (steamed dumplings stuffed with meat and soup), hamburger, sausage, meat-filled buns, or the like, thereby improving their taste.

2. Prior Art

Hitherto, chopped or minced meat has been used as a raw material in the production of foods such as jiaozi, shaomai, wonton, shaoronpo, hamburger, sausage, meat-filled buns and similar foods. The above-listed foods are generally produced by mixing and kneading the chopped meat with other raw materials such as vegetables and the like. The mixture is then used as an ingredient and wrapped with a film or dough of wheat flour or, alternatively, the mixture is molded into any desired shape. After wrapping or molding, the product is roasted on a frying pan, fried in an edible oil, boiled or steamed.

The above-described type of foods, however, have an important drawback which is a loss of their specific flavor and hence their reduced taste. This drawback is believed to result caused by the fact that when the food are heated in any subsequent step, meat juice of the chipped meat flows out from the foods and thus only a flesh structure of the meat having no extract component remains in the foods. In addition, for the meat-filled buns, they suffer from a tendency of rupture of their outer covering, because the dough of the wheat flour forming the covering is excessively expanded in the presence of the meat juice flowed out from the meat.

Recently, food products utilizing capsules having incorporated therein many different materials have been suggested. As an example, Japanese Unexamined Patent Publication (Kokai) No. 56-42536 suggests to encapsulate additives such as fruit jam, honey, butter or the like. The encapsulated additives are then incorporated into breads or confectioneries. However, it does not teach to utilize such encapsulization technique in the production of jiaozi, shaomai, wonton, shaoronpo, hamburger, sausage, bun with meat filling or similar foods for the purpose of improving their taste. In fact, none of the prior arts discloses the use of the capsules in the production of these specified foods in order to improve their taste.

It is, therefore, an object of the present invention to retain the meat soup or juice in the jiaozi, shaomai, wonton, shaoronpo, hamburger, sausage, meat-filled buns or similar food products and, as a result, to improve their taste.

SUMMARY OF THE INVENTION

The present invention relates to a food product selected from the group consisting of jiaozi, shaomai, wonton, shaoronpo, hamburger, sausage, meat-filled buns and similar food products, and is characterized in that the food product has capsules distributed therein, each of the capsules containing meat soup or juice surrounded with an edible material.

Since the thus encapsulated meat soup can not flow out of the food product during its cooking with heat, a meat extract of the capsules can be constantly retained in the food product, thereby conferring a good taste to the product.

BRIEF DESCRIPTION OF THE DRAWINGS

The present invention will be further described with reference to the accompanying drawings in which.

DESCRIPTION OF PREFERRED EMBODIMENTS

Figure 1:
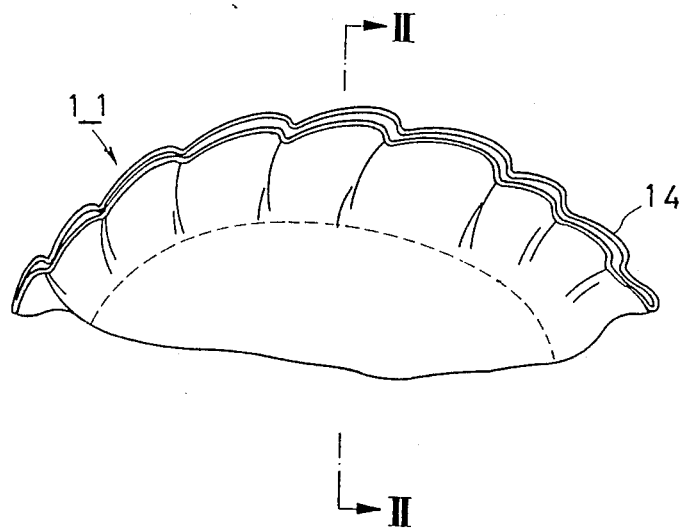
FIG. 1 is a perspective view showing an example of applying the present invention to the jiaozi.

In the present invention, capsules in which the meat soup or juice is surrounded with an edible material can be produced in accordance with the following manner, for example:

First, as a source material for the meat soup, any meat or bone or a mixture of meat and bone, for example, butcher's meat, fish meat or their bones can be used. In order to save the costs, scraps or pieces of meat, chicken bones, offals of fishes or the like may be particularly used. In addition to the meat and/or bone, vegetables such as carrot, onion, Welsh onion, parsley, laurel or the like, and flavour enhancers such as salt, pepper, sodium glutamate or the like may be used separately or in combination. These source materials are boiled in water and then filtered to prepare a broth or stock. The broth may be itself used as the meat soup or, if desired, it may be used after concentration. Alternatively, the meat soup may be prepared from a ready-made meat extract preparation such as bouillon or the like.

According to the present invention, the thus prepared meat soup is then encapsulated with any edible material. Useful edible materials include alginic acid, agar-agar, carragheenin, pectin or other gellable polysaccharides, gelatin and similar materials, for example.

Using alginic acid as the edible material, the encapsulated meat soup can be prepared as follows: To the meat soup prepared as previously described, soluble and edible calcium salt such as calcium lactate, calcium acetate, calcium phosphate, calcium chloride or the like is preferably added in an amount of 2.0% by weight or less, more preferably in an amount of 1.0% by weight or less. The mixture is dropped in an aqueous solution of sodium alginate which is preferably about 0.3 to 5.0% by weight and more preferably about 0.5 to 3.0% by weight. As a result, calcium ions contained in the meat soup are reacted with alginic acid in its aqueous solution to form a plurality of capsules each of which comprises a droplet of the meat soup having applied on a surface thereof a capsule coating of calcium alginate gel. The coating of the capsules exhibits a desired thickness and strength when about 10 seconds to 5 minutes passed after completion of dropwise addition of the mixture. Then, the capsules are removed from the aqueous solution and washed with water. If necessary, the washed capsules may be dipped into the aqueous solution or meat soup used in order to remove an excess amount of calcium salts.

When agar-agar, gelatin or similar material is used as an edible material in the production of the meat soup-containing capsules, such an edible material is first molded to a tubular product. The meat soup which was prepared in the above-described manner is then injected into an interior of the tubular product, and both ends of the product are heat-sealed at a predetermined length. A tubular capsule having incorporated therein the meat soup is thus obtained. The agar-agar and gelatin, as described hereinafter, have a tendency to melt upon heating, but they can prevent flow of the meat soup out of the capsule, because a melt of the agar-agar and gelatin has a sufficient viscosity to maintain a capsule configuration in which the meat soup is being embedded in the agar-agar and gelatin.

The foods according to the present invention contain capsules which were formed as described above. Raw materials for the present foods vary depending upon particular foods such as jiaozi, shaomai, wonton, shaoronpo, hamburger, sausage, meat-filled buns or the like. Typical examples of the raw materials include chopped or minced meat, onion, Chinese leek, cabbage, Welsh onion, garlic, carrot, "Shiitake" mushroom and other conventional raw materials. Two or more of these raw materials are mixed intimately depending on a desired composition of the resulting food, and are incorporated with a suitable amount of the above capsules. After mixing, for the production of the jiaozi, shaomai, wonton, shaoronpo, and meat-filled buns, the mixture is wrapped with a paste or dough of wheat flour, and then molded to a desired shape. Further, for the production of the hamburger, the above mixture itself is molded with hand or using a conventional machine to a desired shape. In the production of the sausage, the mixture is filled in an edible casing such as hog, beef and sheep casings, and then molded. These molded products are finally subjected to a thermal treatment to obtain the food products of the present invention. For example, they may be roasted or grilled on an oiled frying pan of the like to produce the jiaozi and hamburg, they may be steamed to produce the shaomai, shaoronpo and meat-filled buns, and they may be boiled in soup or the like to produce the wonton. In an alternative the jiaozi and shaomai may be fried in an edible oil to produce fry foods. Further, the edible casing with contents for use in the production of the sausage may be heated and sterilized using any conventional steam heating means.

While the present foods were described with regard to the use of the thermal treatment in the above paragraph, they may be supplied to users after molding and before heating. Just before cooking, the users will heat the foods by themselves in house.

The following examples are included to further understand the present invention.

EXAMPLE 1

One (1) kg of chicken bones, 100 g of onion and 100 g of carrot were boiled in 3 l of water for about one hour. The resulting stock was filtered, and the filtrate was added with a small amount of salt and pepper. 1 l of meat soup was thus prepared. 10 g of calcium lactate was added and dissolved in the resulting meat soup, and the solution was dropwise added to a 1% by weight of aqueous solution of sodium alginate. As a result, a capsule coating consisting of calcium alginate gel was formed on a surface of each of the meat soup droplets. The thus produced, meat soup-filled capsules had an average diameter of about 5 mm.

150 g of sliced onion, 50 g of thin pieces of Chinese leek, 300 g of cut pieces of cabbage, 200 g of minced pork, salt and soy sauce were mixed. The mixture was weighed to take its suitable amount. Then, it was mixed with two capsules prepared in the above step, and wrapped with a commercially available wheat flour film for jiaozi. The wrapped product was finally roasted on an oiled frying pan to produce a roasted jiaozi.

Figure 2:
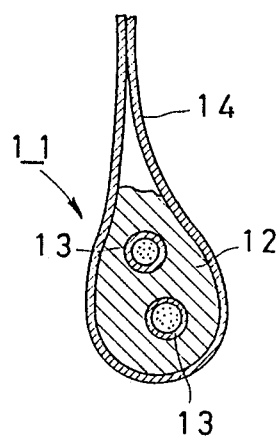
FIG. 2 is a cross-sectional view taken along line II—II of FIG. 1.

The thus produced jiaozi is illustrated in FIGS. 1 and 2. These drawings show that the jiaozi 11 comprises ingredients 12 consisting of onion, Chinese leek, cabbage, minced pork and the rest, the ingredients 12 having incorporated therein meat soup-containing capsules 13 and being wrapped with the wheat flour film 14. The capsules 13 were ruptured with a compressive force during eating of the jiaozi 11, thereby resulted in a good taste as a result of exudation of the meat soup through the capsule coating.

EXAMPLE 2

One (1) kg of shin beef, 500 g of shinbone, 150 g of onion and 100 g of Welsh onion were boiled in 3 l of water for about one hour. The stock was filtered and left to cool. Thereafter, the filtrate was concentrated on an evaporator to make 500 ml. The concentrate was added with small amounts of salt and pepper to make a meat soup. 5 g of calcium lactate was added and dissolved in the meat soup, and the resulting solution was dropped in a 1.0% by weight of aqueous solution of sodium alginate. As a result of this addition, a capsule coating consisting of calcium alginate gel was formed on a surface of each of the dropped meat soup. The capsules has an average diameter of about 8 mm.

150 g of sliced onion, 50 g of thinly cut Welsh onion, 3 g of dogtooth violet starch, 200 g of minced pork, salt, pepper and sesame oil were mixed. A suitable amount of the mixture was then mixed with two capsules which were previously prepared. The mixture was surrounded with a commercially available wheat flour film for shaomai, and steamed in a steamer for about 13 minutes.

Figure 3:
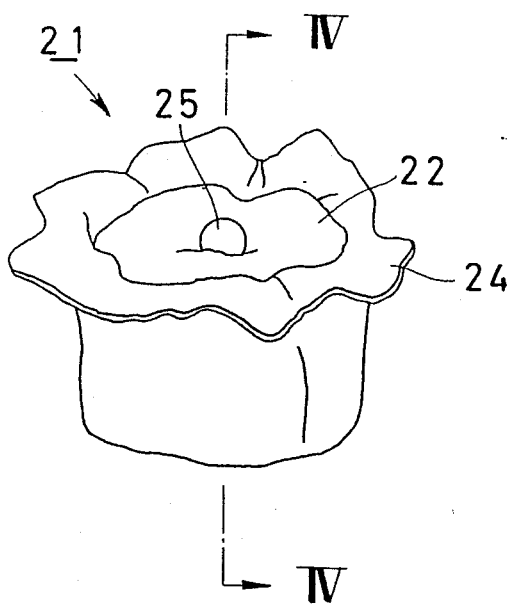
FIG. 3 is a perspective view illustrating another example of applying the present invention to the shaomai.
Figure 4:
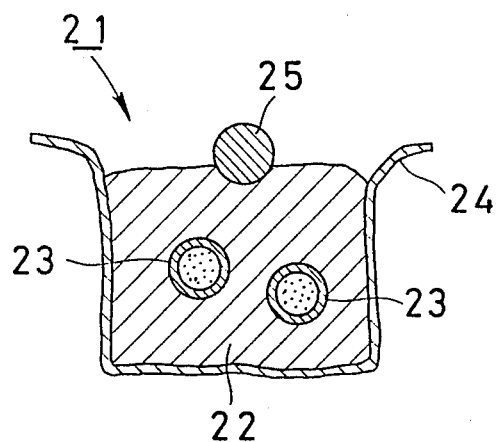
FIG. 4 is a cross-sectional view taken along line IV—IV of FIG. 3.

FIGS. 3 and 4 illustrate the shaomai prepared in the above process. In these drawings, the shaomai 21 comprises ingredients 22 which consist of onion, Welsh onion, minced pork and others. The ingredients 22 contain meat soup-incorporated capsules 23 and, in addition, have a wrapping 24 formed of the wheat flour film. The reference numeral 25 indicates a green pea. The shaomai 21 exhibited a good taste, because, when eaten, its capsules 23 were ruptured and their contents, namely, meat soup, were effectively distributed within the interior of the shaomai 21.

I claim:

1. A food product comprising a food selected from the group consisting of jiaozi, shaomai, wonton, shaoronpo, hamburger, sausage and meat-filled buns, said food containing capsules distributed therein, each of which capsules comprises a droplet of meat soup or juice the surface of which droplet is surrounded with a coating of an edible gel material, said coating being capable of maintaining capsule configuration when said food product is subjected to heat during cooking so that droplet interior is retained, and upon application of compressive force during consumption of the food product, the capsules are ruptured and release their liquid contents of soup or juice to improve the taste of the food product.

2. The food product as set forth in claim 1 in which the edible gel material is calcium alginate.

3. The food product as set forth in claim 1 in which the meat soup or juice is prepared by boiling meat or bone or a mixture of meat and bone of edible animals, chickens and fishes in water to thereby obtain a soup.

4. The food product as set forth in claim 3, wherein said soup is subjected to a concentrating process to thereby obtain a concentrated soup.

5. The food product as set forth in claim 1 in which the food is one prepared using at least one raw material selected from the group consisting of chopped meat, onion, Chinese leek, cabbage, Welsh onion, garlic, carrot and "Shiitake" mushroom.

6. The food product as set forth in claim 1, which further comprises a film or dough of wheat flour which is used as a wrapper for said food.

7. A food product comprising a chopped food selected from the group consisting of meat, vegetable, chicken, fish and mixtures thereof, and capsules distributed therein, said capsules containing a droplet of soup or juice surrounded at its surface with a coating of an edible gel material which is calcium gel, and upon application of compressive force during consumption of the food product after it has been cooked, the capsules are ruptured and release their liquid contents of soup or juice to improve the taste of the food product.

8. The food product as set forth in claim 7, further comprising a film or dough of wheat flour which is used as a wrapper for the chopped food.

9. The food product as set forth in claim 7, wherein the soup or juice is derived from meat, fish, bone, chicken, vegetable or mixtures thereof.

10. The food product as set forth in claim 7 in which the food is one prepared using at least one raw material selected from the group consisting of chopped meat, onion, Chinese leek, cabbage, Welsh onion, garlic, carrot and "Shiitake" mushroom.

* * * * *